(12) United States Patent
Gaonkar et al.

(10) Patent No.: US 11,249,899 B2
(45) Date of Patent: Feb. 15, 2022

(54) FILESYSTEM MANAGEMENT FOR CLOUD OBJECT STORAGE

(71) Applicant: Cisco Technology, Inc., San Jose, CA (US)

(72) Inventors: Shravan Gaonkar, Gainesville, FL (US); Mayuresh Vartak, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 214 days.

(21) Appl. No.: 16/135,422

(22) Filed: Sep. 19, 2018

(65) Prior Publication Data
US 2020/0089607 A1     Mar. 19, 2020

(51) Int. Cl.
*G06F 12/02*     (2006.01)
*G06F 3/06*     (2006.01)
(Continued)

(52) U.S. Cl.
CPC .......... *G06F 12/0253* (2013.01); *G06F 3/067* (2013.01); *G06F 3/0617* (2013.01);
(Continued)

(58) Field of Classification Search
CPC .. G06F 12/0868; G06F 16/185; G06F 16/215; G06F 2212/466; G06F 3/0604; G06F 3/0649; G06F 3/0685; G06F 12/0253; G06F 12/0269; G06F 12/0276; G06F 2212/702; Y10S 707/99957; Y10S 707/966
(Continued)

(56) References Cited

U.S. PATENT DOCUMENTS 8,799,413 B2    8/2014    Taylor et al.
9,367,551 B2    6/2016    Beaverson et al.
(Continued)

OTHER PUBLICATIONS

Andres Levitski, "Building Distributed File Systems on Commercial Cloud Storage Services", University of Helsinki, Department of Computer Science, Jan. 5, 2016, 64 pages.
(Continued)

*Primary Examiner* — Alex Gofman
*Assistant Examiner* — Linh Black
(74) *Attorney, Agent, or Firm* — Edell, Shapiro & Finnan, LLC (57) ABSTRACT

Techniques for filesystem management for cloud object storage are described. In one embodiment, a method includes writing, by a filesystem layer, a plurality of entries to a log structured file tree, including filesystem metadata and filesystem data. The method includes performing a flush operation of the entries from the filesystem layer to one or more objects in a distributed cloud object storage layer. The method includes storing the filesystem metadata and the filesystem data to the one or more objects in the distributed cloud object storage layer. The method further includes storing flush metadata generated during each flush operation, including a flush sequence number associated with each flush operation. Each object of the one or more objects in the distributed cloud object storage layer is identified by a key that identifies the flush sequence number, an object identifier, and a rebirth identifier.

20 Claims, 6 Drawing Sheets

(51) Int. Cl.
  G06F 9/54 (2006.01)
  G06F 16/907 (2019.01)
  G06F 16/22 (2019.01)
(52) U.S. Cl.
  CPC ............ G06F 3/0644 (2013.01); G06F 9/545 (2013.01); G06F 16/2246 (2019.01); G06F 16/907 (2019.01)
(58) Field of Classification Search
  USPC ......... 707/813–814, 819–820, 672, 682, 822
  See application file for complete search history.

(56) References Cited

U.S. PATENT DOCUMENTS

| | | | |
|---|---|---|---|
| 9,448,927 B1 | 9/2016 | Agarwala et al. | |
| 9,521,198 B1 | 12/2016 | Agarwala et al. | |
| 9,582,421 B1 | 2/2017 | Agarwala et al. | |
| 9,632,711 B1* | 4/2017 | Obr | G06F 12/0804 |
| 9,652,471 B1 | 5/2017 | Krishnan et al. | |
| 9,720,619 B1 | 8/2017 | Shah et al. | |
| 9,965,203 B1 | 5/2018 | Agarwala et al. | |
| 10,216,949 B1* | 2/2019 | McKelvie | G06F 21/6227 |
| 10,229,011 B2* | 3/2019 | Leshinsky | G06F 3/0619 |
| 10,303,564 B1* | 5/2019 | Gupta | G06F 11/1474 |
| 10,474,656 B1* | 11/2019 | Bronnikov | G06F 16/217 |
| 2010/0223429 A1* | 9/2010 | Cher | G06F 12/0848 711/122 |
| 2011/0125813 A1* | 5/2011 | Pradhan | G06F 12/0269 707/814 |
| 2012/0203803 A1* | 8/2012 | Burka | G06F 12/0269 707/820 |
| 2012/0246433 A1* | 9/2012 | Plancarte | G06F 12/0269 711/166 |
| 2014/0136575 A1* | 5/2014 | Zhao | G06F 16/215 707/813 |
| 2014/0279900 A1* | 9/2014 | Gupta | G06F 16/219 707/634 |
| 2014/0279920 A1* | 9/2014 | Madhavarapu | G06F 11/1458 707/649 |
| 2016/0110403 A1* | 4/2016 | Lomet | G06F 16/2322 707/695 |
| 2017/0132091 A1* | 5/2017 | Leshinsky | G06F 11/1471 |

OTHER PUBLICATIONS

Kai Ren, "Fast Storage for File System Metadata", CMU-CS-17-121, Sep. 26, 2017, School of Computer Science, Carnegie Mello University, submitted in partial fulfillment of the requirements for the degree of Doctor of Philosophy, 165 pages.

ASF Infrabot, "Durability—CASSANDRA2—Apache Software Foundation", Jul. 11, 2019, 2 pages.

Cisco, "Cisco HyperFlex Systems", LE-54802-06, Jul. 2019, 22 pages.

* cited by examiner

FILESYSTEM MANAGEMENT FOR CLOUD OBJECT STORAGE

TECHNICAL FIELD

This disclosure relates generally to a distributed storage system.

BACKGROUND

Solely on-premise Enterprise storage systems are proprietary storage appliances that integrate the storage controller functions and the storage media into the same physical unit. This model makes it harder to elastically scale the storage systems' capacity, performance and cost based on customers' storage demands. Cloud computing environments can be implemented to provide low cost and highly available cloud-based storage services to meet such ever-growing and elastic data storage demands. Cloud-based storage generally provides storage hosted by a third party service provider, where data storage can be purchased for use on an as-needed basis. This allows for expanding data storage capacity without incurring costs associated with adding dedicated storage. This creates the need for cloud storage service solutions which can be deployed on-cloud or hybrid (along with on-premise) environments that provide enterprise ready features, such as snapshots, backup, and recovery of applications.

DESCRIPTION OF EXAMPLE EMBODIMENTS

Overview

Presented herein are general architecture and techniques for filesystem management for cloud object storage. In an example embodiment, a method includes writing, by a filesystem layer, a plurality of entries to a log structured file tree. The plurality of entries includes filesystem metadata and filesystem data. The method also includes performing a flush operation of the plurality of entries in the log structured file tree from the filesystem layer to one or more objects in a distributed cloud object storage layer comprising a plurality of distributed storage devices by an intermediate layer disposed between the filesystem layer and the distributed cloud object storage layer. The method includes storing the filesystem metadata and the filesystem data from the plurality of entries in the log structured file tree to the one or more objects in the distributed cloud object storage layer. The method further includes storing flush metadata generated by the intermediate layer during each flush operation. The flush metadata includes a flush sequence number associated with each flush operation. Each object of the one or more objects in the distributed cloud object storage layer is identified by a key that identifies the flush sequence number, an object identifier, and a rebirth identifier.

Example Embodiments

A variety of different services provide persistent distributed cloud object storage. A filesystem layer executing on top of these cloud object storage services can provide features such as snapshots, backup and recovery of applications for enterprise ready features. The Institute of Electrical and Electronics Engineers (IEEE) has developed a set of standards for a Portable Operating System Interface (POSIX) that defines a standard operating system interface and environment, including a command interpreter (or "shell"), and common utility programs to support applications portability at the source code level. Cisco Technology's Hyperflex 3.0 (HX) provides an example of a POSIX interface solution in a distributed manner for a converged infrastructure system that integrates computing, networking and storage resources to increase efficiency and enable centralized management. For example, a filesystem layer, such as HX, may be implemented as described in one or more of U.S. Pat. Nos. 9,965,203; 9,220,619; 9,582,421; 9,521,198; 9,448,927, the contents of which applications are hereby incorporated by reference in their entirety.

The nodes of the filesystem layer (e.g., HX) use raw block devices as its back-end to store and service the data. According to the example embodiments described herein, instead of using persistent storage block devices as the back-end of the filesystem layer nodes, globally accessible distributed cloud storage services may be used so that a cluster, such as Hyperflex, may be implemented completely in a public cloud infrastructure from one or more cloud storage services or in hybrid fashion along with on-premise nodes.

Hyperflex uses the concept of virtual node (vnode) as unit of data routing and management. According to the implementation in the example embodiments, the filesystem layer includes three types of vnodes, including cache-vnode (cvnodes), to store intent log data; namespace-vnode (ns-node), that stores the directory, filenames, attributes, and other information; a filetree-vnode (ftnode) that stores the metadata and data associated with filesystem. These virtual nodes allow mapping from requests received from users or clients via the POSIX-compliant interface to the actual physical nodes and serve the data. The content of the file writes are written in a log structured format that is called the Log Structured File Tree (LSFT), which is rooted at each filetree-vnode (ftnode).

Each key in this LFST, from the root-level, is of a particular format that uniquely determines the location from which content in the filesystem layer can be retrieved. Any value retrieved for nodes that are intermediate nodes in the tree have list of keys (i.e., metadata) for the next lower level in the tree. The values retrieved at leaf-level nodes in the tree provide the user or client data that is to be served to the requester. Each of these node-entries in the LSFT are called a file-tree object (FTO), which has information pertaining to the filesystem layer. The FTO maps a logical entry about a particular file or the filesystem layer to an actual location in a distributed cloud object storage layer or a cloud object store (COS). The process of mapping and serialize the FTOs will be described in more detail below in order to map read and/or write operations from the filesystem layer to the distributed cloud object storage layer.

For performance, and cost-effectiveness, a filesystem layer may use a logger function (such as a WriteLog) to batch input/output (I/O) writes coming into the LFST in an intent log or a read/write cache, which may be any kind of temporary memory or storage (e.g., a solid-state drive (SSD)). These I/O writes are sequentially written into the intent log by the logger function. Once the intent log gets full, the I/O writes are dispatched down to a persistent memory layer for stable storage in a tree format. The operation of writing these intent logs into the persistent memory layer is called a flush operation (also referred to as a flush). The flush operation acts to persist the intermediate layer to data at rest. As described herein, each flush operation may be uniquely identified by a flush sequence number (FSN). In an example embodiment, the flush sequence number is a monotonously increasing flush sequence number for each successful flush operation. According to the example embodiments described herein, an intermediate layer disposed between the filesystem layer and the persistent memory layer (e.g., a distributed cloud object storage layer) is provided to implement techniques for filesystem management for cloud object storage associated with these flush operations.

Figure 1:
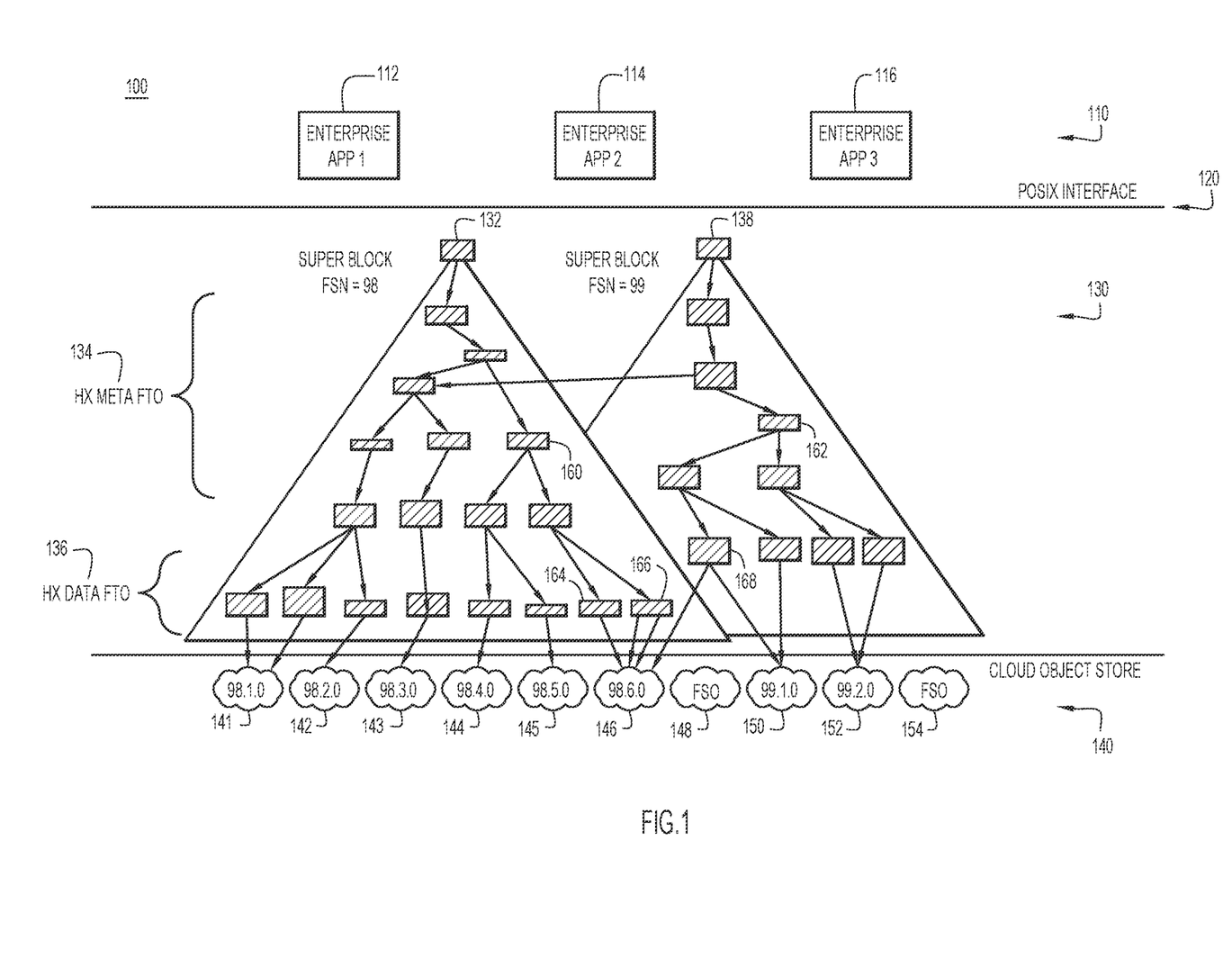
FIG. 1 is a diagram illustrating techniques for filesystem management for cloud object storage, according to an example embodiment.

Referring now to FIG. 1, a diagram illustrating a layout of a system 100 for implementing techniques for filesystem management for cloud object storage is shown according to an example embodiment. In this embodiment, system 100 includes a filesystem layer 110, an intermediate layer 130, and a distributed cloud object storage layer 140. Filesystem layer 110 may be a cluster that includes one or more users or clients executing applications or other services on filesystem layer 110. For example, in this embodiment, filesystem layer 110 includes a first enterprise application 112, a second enterprise application 114, and a third enterprise application 116. Each enterprise application 112, 114, 116 may be associated with a common enterprise or may be associated with different companies or users.

In this embodiment, filesystem layer 110 also includes a POSIX-compliant interface 120 to allow users or clients of applications (e.g., first enterprise application 112, second enterprise application 114, third enterprise application 116, etc.) to execute commands to filesystem layer 110, including, for example, one or more read operations and/or write operations. Intermediate layer 130 is disposed between filesystem layer 110 and the persistent memory storage layer, in this case, distributed cloud object storage layer 140. As will be described in more detail below, intermediate layer 130 implements techniques for filesystem management for cloud object storage. That is, intermediate layer 130 assists with storage and/or retrieval of data that was written into the LSFT by filesystem layer 110 and flushed into persistent storage in the distributed cloud object storage layer 140. In some embodiments, intermediate layer or proxy layer 130 may also be referred to as a cloud filesystem or "CloudFS".

Cloud storage service providers allow clients to write large Binary Large OBjects (BLOBs) as key-value pairs. A key-value pair is a set of two linked data items: a key, which is a unique identifier for some item of data, and the value, which is either the data that is identified or a pointer to the location of that data. Accordingly, it would be possible for a flush operation to be written into a single object in the distributed cloud object storage layer. If each flush would be written as a single object, however, it would very large (about 32 GB or more). Instead, according to the principles of the example embodiments described herein, the flushed objects are split into chunks to make them more manageable and to improve performance. Each chunk is assigned an identifier, called an object identifier (obj-ID). Furthermore, to improve speed of writing/reading these chunks, each of these objects may be further sub-partitioned into multiple parts, with each part labeled with part-id.

As shown in FIG. 1, intermediate layer 130 serializes the data from the intent log of the filesystem layer 110 to objects in the distributed cloud object storage layer 140. In an example embodiment, an initial flush operation (e.g., a first flush operation) for data written into an intent log by filesystem layer 110 (e.g., data from one or more read/write operations executed by enterprise applications 112, 114, 116) may be associated with a first super block 132. In this embodiment, the initial flush operation may be assigned a flush sequence number (FSN=98). The data in the initial flush operation associated with first super block 132 includes a plurality of filesystem metadata objects 134 and a plurality of filesystem data objects 136. In this embodiment, plurality of filesystem metadata objects 134 and plurality of filesystem data objects 136 are stored to distributed cloud object storage layer 140 in a plurality of cloud objects, including a first cloud object 141, a second cloud object 142, a third cloud object 143, a fourth cloud object 144, a fifth cloud object 145, and a sixth cloud object 146. In an example embodiment, each of the cloud objects are identified by keys, with each key identifying a flush sequence number (FSN), an object identifier (obj-ID), and a rebirth identifier (rebirth-ID). For example, a key may have the format <FSN, obj-ID, rebirth-ID>. In an example embodiment, the object identifier (obj-ID) is a monotonically increasing number. In addition, the initial rebirth-ID at the time of object creation is 0 and is updated/incremented during a garbage collection process, as described below.

As shown in FIG. 1, first cloud object 141 is associated with a first key (98.1.0), second cloud object 142 is associated with a second key (98.2.0), third cloud object 143 is associated with a third key (98.3.0), fourth cloud object 144 is associated with a fourth key (98.4.0), fifth cloud object 145 is associated with a fifth key (98.5.0), and sixth cloud object 146 is associated with a sixth key (98.6.0).

In addition to writing the sequence of data (e.g., filesystem metadata objects 134 and plurality of filesystem data objects 136) from first super block 132 to the distributed cloud object storage layer 140 in plurality of cloud objects 141-146, intermediate layer 130 also writes a summary object 148 that includes the list of all the keys that were flushed as a part of the current flush (i.e., the initial or first flush operation, FSN=98). This summary object 148 in the distributed cloud object storage layer 140 is called a flush summary object (FSO), and it may be later updated by intermediate layer 130 during the garbage collection process, as will be described below.

Additionally, subsequent flush operations may be handled in a similar manner. For example, a next flush operation (e.g., a second flush operation) for data written into an intent log by filesystem layer 110 may be associated with a second super block 138. In this embodiment, this next flush operation may be assigned a flush sequence number (FSN=99) that is one greater than the previous flush sequence number (i.e., FSN=98). The data in this next flush operation associated with second super block 138 includes a plurality of filesystem metadata objects and a plurality of filesystem data objects that are stored to distributed cloud object storage layer 140 in a plurality of cloud objects, including a seventh cloud object 150 associated with a seventh key (99.1.0) and an eighth cloud object 152 associated with an eighth key (99.2.0). Intermediate layer 130 also writes another summary object 154 that includes the list of all the keys that were flushed in the current flush (i.e., second flush operation, FSN=99).

It should be noted that during each flush operation, one or more of the plurality of filesystem metadata objects and/or plurality of filesystem data objects associated with a previous flush operations (e.g., first flush operation, FSN=98) may also be shared with the current flush operation (e.g., second flush operation, FSN=99). In these instances, only new data and corresponding metadata is written to distributed cloud object storage layer 140 as a part of flush operation and some of the resulting cloud objects for filesystem metadata may point to cloud objects from the older flush operations. For example, the file tree (i.e., LSFT) from the next flush operation would still point to old objects (e.g., objects associated with initial flush operation FSN=98) for any unmodified data.

Figure 2:
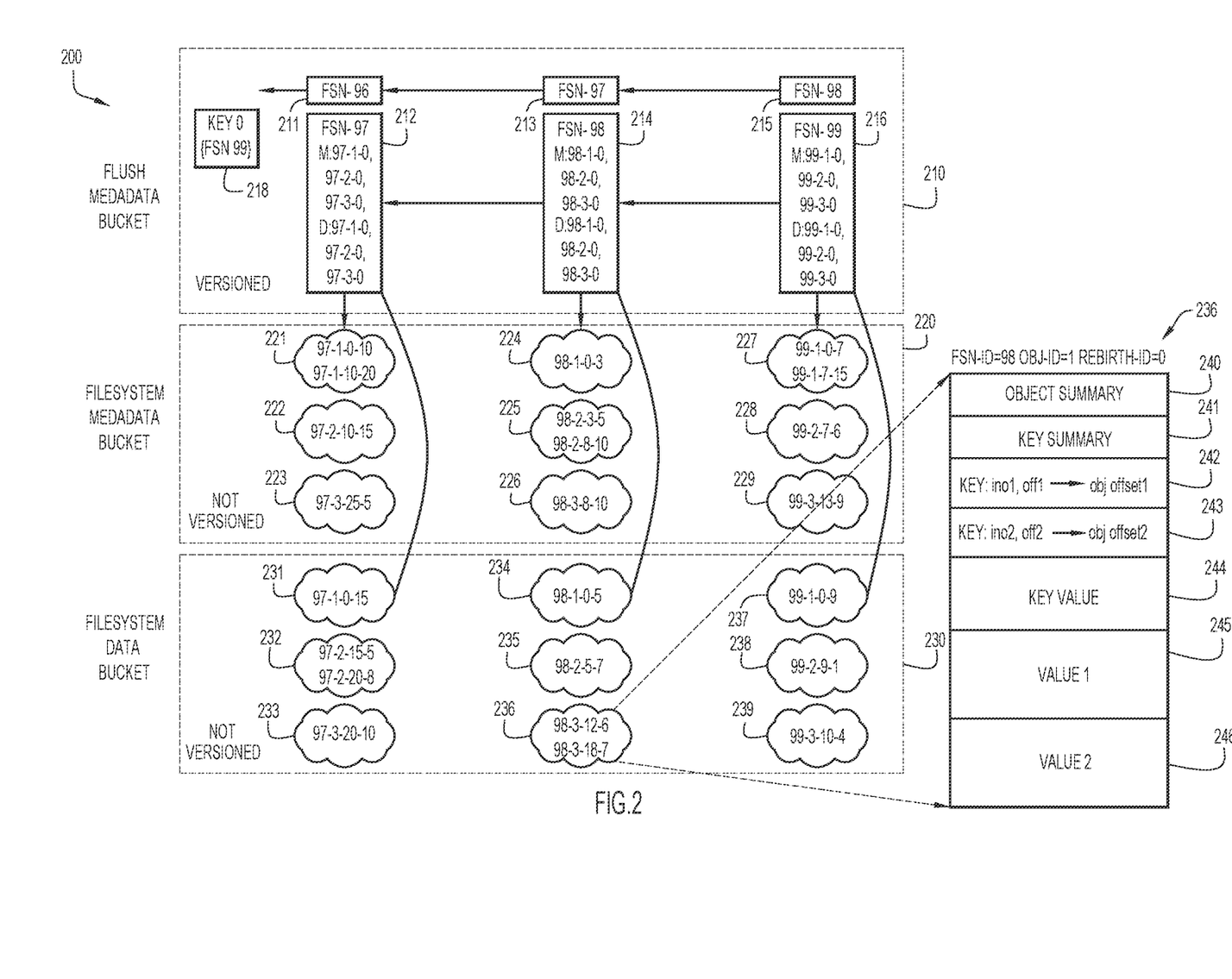
FIG. 2 is a diagram illustrating a flush operation to a distributed cloud object storage layer, according to an example embodiment.

FIG. 2 illustrates a logical arrangement 200 of the content from the intent log of filesystem layer 110 that is managed by intermediate layer 130 during a flush operation to distributed cloud object storage layer 140 according to an example embodiment. In this embodiment, intermediate layer 130 is a proxy layer (e.g., a cloud filesystem) that is disposed between the filesystem layer 110 and the distributed cloud object storage layer 140. Intermediate layer 130 provides management and data I/O interfaces to the filesystem layer 110.

As shown in FIG. 2, the intermediate layer 130 provides logical arrangement 200 that groups or partitions the file tree contents from the intent log of filesystem layer 110 into different logical zones or buckets for simplified management. For each logical partition of the file tree (i.e., LSFT), three zones or buckets are assigned: filesystem metadata bucket 220, filesystem data bucket 230, and flush metadata bucket 210.

Generally, cloud infrastructure supports two types of logical zones/buckets: versioned and non-versioned. Writes to a versioned bucket with the same key creates a key-value pair with a new version, whereas the same operation to a non-versioned bucket replaces the previously existing key-value pair. In this embodiment, filesystem metadata bucket 220 and filesystem data bucket 230 are non-versioned buckets, and flush metadata bucket 210 is a versioned bucket. For each virtual data node (ftnode) these three types of buckets are created.

Filesystem metadata bucket 220 includes a plurality of objects associated with filesystem metadata. For example, as shown in FIG. 2, filesystem metadata bucket 220 includes a first plurality of objects associated with a flush operation having a FSN=97, including a first object 221, a second object 222, and a third object 223. Similarly, filesystem metadata bucket 220 includes objects associated with subsequent flush operations. For example, filesystem metadata bucket 220 also includes a second plurality of objects associated with a flush operation having a FSN=98 (i.e., a flush operation subsequent to FSN=97), including a fourth object 224, a fifth object 225, and a sixth object 226, and a third plurality of objects associated with another flush operation having a FSN=99 (i.e., a flush operation subsequent to FSN=98), including a seventh object 227, an eighth object 228, and a ninth object 229.

Filesystem data bucket 230 contains a plurality of objects associated with filesystem data (e.g., user application data). For example, as shown in FIG. 2, filesystem data bucket 230 includes a first plurality of objects associated with a flush operation having a FSN=97, including a first object 231, a second object 232, and a third object 233. Similarly, filesystem data bucket 230 includes objects associated with subsequent flush operations FSN=98 and FSN=99. For example, filesystem data bucket 230 also includes a second plurality of objects associated with the flush operation having FSN=98, including a fourth object 234, a fifth object 235, and a sixth object 236, and a third plurality of objects associated with another flush operation having FSN=99, including a seventh object 237, an eighth object 238, and a ninth object 239.

Flush metadata bucket 210 contains a plurality of objects associated with metadata information used by intermediate layer 130 to store this data. In this embodiment, flush metadata bucket 210 contains three types of objects: a Root Key (Key-0) referring to the FSN of the last successful flush operation; Flush Summary Objects which contain flush metadata information for a given flush sequence number; and Flush Pointer Objects which contain FSN of the previous successful flush. Flush metadata bucket 210 includes only one Root Key (Key-0), whereas Flush Summary Objects and Flush Pointer Objects are created for each successful flush operation.

For example, as shown in FIG. 2, flush metadata bucket 210 includes a plurality of Flush Summary Objects, including a first flush summary object 212 that includes metadata information for the flush operation having FSN=97, a second flush summary object 214 that includes metadata information for the flush operation having FSN=98, and a third flush summary object 216 that includes metadata information for the flush operation having FSN=99. Flush metadata bucket 210 also includes a plurality of Flush Pointer Objects, including a first flush pointer object 211 that includes the FSN of the previous successful flush operation prior to the creation of first flush summary object 212 (i.e., FSN=96), a second flush pointer object 213 that includes the FSN of the previous successful flush operation prior to second flush summary object 214 (i.e., FSN=97), and a third flush object pointer object 215 that that includes the FSN of the previous successful flush operation prior to third flush summary object 216 (i.e., FSN=98).

The maximum size of objects included in filesystem metadata bucket 220 (e.g., objects 221-229) and objects included in filesystem data bucket 230 (e.g., objects 231-239) may be set to be of a predefined size. If a flush operation includes more data that is to be written, more objects are created in each respective bucket, with the object-id for each object incremented monotonically to accommodate the additional data.

At the start of a flush operation, the next monotonically increasing FSN is assigned to the new flush operation. The filesystem metadata and filesystem data consists of key-value pairs which are packed into objects in their corresponding filesystem metadata bucket 220 and filesystem data bucket 230. Each object in filesystem metadata bucket 220 and filesystem data bucket 230 is identified by a corresponding key with the format <FSN, obj-ID, rebirth-ID>, as described above. As each flush creates new key-value pairs, the rebirth identifier (rebirth-ID) for key-value pairs generated by a flush operation is equal to zero (rebirth-ID=0). The filesystem key-values packed into an object are divided into two sections: a main section and a summary section. The main section contains values of the key-value pairs. Their corresponding keys and other metadata information is packed into the summary section while maintaining a strict packing order. Offsets of the summary section with respect to the start of the object is updated as a part of object attributes.

As described above, Flush Summary Objects belonging to flush metadata bucket 210 (e.g., flush summary objects 212, 214, 216) are versioned with their own special format. These objects are considered as the root metadata object for each flush operation triggered from the filesystem layer 110. Each of flush pointer objects 211, 213, 215 are chained to refer to the previous valid flush operation. Additionally, flush metadata bucket 210 includes a Root Key, for example, a special key 218 (shown as Key 0 in FIG. 2), that indicates the FSN of the last valid flush operation that was written into the system. As shown in FIG. 2, special key 218 indicates FSN=99 as being the flush sequence number for the last valid/successful flush operation.

In summary, the filesystem layer 110 flushes or persists the information from the intent log (e.g., data from one or more users or clients using filesystem layer 110), which may be captured in a read/write cache or other temporary memory/storage, in a serialized format on the distributed cloud object storage layer 140. The filesystem layer 110 creates a LSFT of the incoming user writes, as shown in FIG. 1. These writes may be new data or modifications to existing data that are captured in key-value pairs. The contents of the intent log (e.g., the LSFT) are sent down to the intermediate layer 130 in batches, which then persists the contents into the distributed cloud object storage layer 140. Each flush operation is assigned a monotonically increasing flush sequence number (FSN). The LSFT content from the intent log may be identified by filesystem keys that have a format <flush sequence number, object id, offset, length, user meta information>. These filesystem keys are part of key-value pairs of user writes, which are batched and written as cloud objects whose key format is <FSN, obj-ID, rebirth-ID>, as described above.

The intermediate layer 130 packs multiple key-value pairs in objects of a predefined size, updates the object-id as it packs them as objects in filesystem metadata bucket 220 and/or filesystem data bucket 230, and writes the objects to the distributed cloud object store layer 140. In some embodiments, the intermediate layer 130 may support writing the objects in parallel, in which case the intermediate layer 130 initiates a multi-part object write. Once the objects are written to the distributed cloud object store layer 140, the intermediate layer 130 notifies filesystem layer 110 that the write is complete (i.e., the flush operation has been completed).

When these cloud objects are packed, they have the following serialized format, which may be described with reference to a representative cloud object 236, as shown in FIG. 2. For example, representative cloud object 236 includes an object summary 240. Object summary 240 includes information and properties about the cloud object (i.e., cloud object 236). For example, object summary 240 can include information to indicate that this object belongs to filesystem data bucket 230. The object summary 240 is followed by a key summary section 241 that includes all of the keys contained in the object (i.e., cloud object 236) as key values having the format described above, where the value of each key summary is the physical offset in the cloud blob. In this embodiment, cloud object 236 includes at least two keys, with each key having a format <FSN-ID, obj-ID, offset, length>. For example, representative cloud object 236 includes a first key 242 (98-3-12-6), and a second key 243 (98-3-18-7). Following key summary section 241 is a key value section 244 that includes the values for each key included in representative cloud object 236. For example, as shown in FIG. 2, key value section 244 of representative cloud object 236 includes a first key value 245 associated with the value for first key 242 and a second key value 246 associated with the value for second key 243.

In addition, a root metadata object for the successfully completed flush operation is created in flush metadata bucket 210. For example, as shown in FIG. 2, flush pointer objects 211, 213, 215 are chained to each previous object for the previous successful flush operation. In other words, third flush pointer object 215 is chained to second flush pointer object 213 associated with the previous flush operation (e.g., FSN=98), second flush pointer object 213 is chained to first flush pointer object 211 associated with the next previous flush (e.g., FSN=97), and first flush pointer object 211 is chained to the pointer object for the previous flush operation (FSN=96), and so on.

Flush metadata bucket 210 also includes flush summary objects 212, 214, 216 associated with, respectively, flush operations having FSN=97, FSN=98, and FSN=99. Each of these flush summary objects 212, 214, 216 include all keys that belong or pertain to the associated flush operation (identified by FSN) and the related metadata information. Upon completion of a successful flush operation, intermediate layer 130 saves a next flush sequence number to the Root Key, for example, special key 218 in flush metadata bucket 210. The next flush sequence number is one greater than the flush sequence number previously identified by special key 218 (i.e., the FSN is monotonically increasing). For example, once flush summary object 216 is successfully written into flush metadata bucket 210 after completion of the flush operation having FSN=99, special key 218 (i.e., Key-0) is updated with this last successful/valid flush sequence number (FSN 99, as shown in FIG. 2).

In an example embodiment, special key 218 in flush metadata bucket 210 may be used by intermediate layer 130 for crash recovery during a flush operation. For example, upon startup after a crash, intermediate layer 130 reads special key 218 in flush metadata bucket 210 to determine a last flush sequence number for the last valid flush operation. In this case, special key 218 identifies FSN=99 as the last valid flush operation. As a result, intermediate layer 130 deletes any objects in filesystem metadata bucket 220, filesystem data bucket 230, and/or flush metadata bucket 210 that are identified by a flush sequence number that is greater than the last flush sequence number. For example, if a flush operation associated with an FSN=100 was in process during a crash, one or more objects associated with this flush operation may be present in filesystem metadata bucket 220, filesystem data bucket 230, and/or flush metadata bucket 210. However, because this flush operation was not successfully completed (i.e., special key 218 was not updated with this new value for FSN=100), intermediate layer 130 will delete any objects associated with FSN=100 upon start up during crash recovery.

A summary of a read operation performed on filesystem metadata bucket 220, filesystem data bucket 230, and/or flush metadata bucket 210 by intermediate layer 130 will be described. For example, in order to read a value for a given key in filesystem metadata bucket 220 or filesystem data bucket 230, first a target object is determined based on the Object-ID associated with the given key. Next, the offset for the given key in the target object is determined using the key summary section of the target object. For example, if performing a read operation on first key 242, the offset for first key 242 is determined from key summary section 241 of representative cloud object 236. In some embodiments, a separate index for key→offset locations may be maintained separately for improved performance. Once the offset is obtained, then the object read operation is issued for the given offset and length.

The read operation process differs slightly in the case of reading from flush metadata bucket 210, due to flush metadata bucket 210 being a versioned bucket. First, the target object is determined based on the Object-ID associated with the given key. In this case, however, a version read is also issued to determine the latest version of the target object. Next, the offset for the given key in the target object is determined using the key summary section of the target object. As with the previous read operation, in some embodiments, a separate index for key→offset locations may also be maintained separately for improved performance. Finally, the object read operation is issued to the target version of the object for the given offset and length.

In example embodiments, intermediate layer 130 may perform translations of requested operations (i.e., data I/O interfaces) from filesystem layer 110 to corresponding operations by intermediate layer 130. For example, the following table shows the translation of an operation from filesystem layer 110 to intermediate layer 130:

| Filesystem layer 110 operation | Intermediate layer 130 operation |
| --- | --- |
| Write segments → | Put (object) multi-part write |
| Read segments → | Get (object) multi-part read |
| Read segment subrange → | Range read |
| Get segment-summary→ | Multi-part read |
| Get latest FSN → | Read Key 0 |

Figure 3:
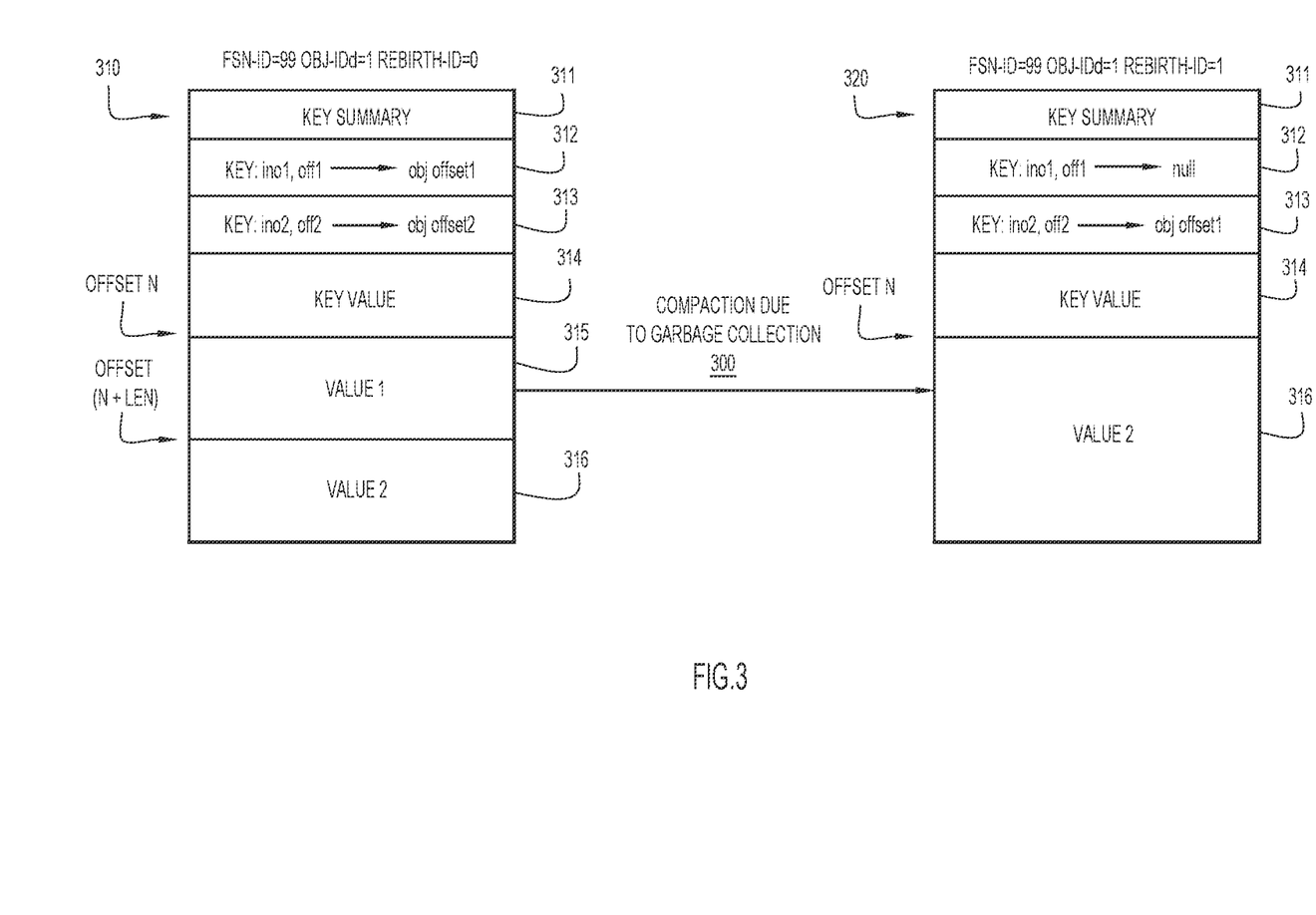
FIG. 3 is a diagram illustrating a garbage collection process, according to an example embodiment.

Referring now to FIG. 3, a garbage collection process (GC) 300 is illustrated according to an example embodiment. Users or clients of filesystem layer 110 continue to modify or delete files as part of regular usage of filesystem layer 110. As the LFST is log-structured, these modifications or deletions are expressed as new/append writes to the LSFT in the intent log of filesystem layer 110. For example, with reference to FIG. 1, a HX Meta FTO block 160 from first flush operation (FSN=99) was later modified to a block 162 in the next flush operation (FSN=99). Due to this modification, intermediate layer 130 needs to eliminate blocks of content 164, 166 while retaining some of the content of a block 168 that is stored in cloud object 146. Because of such writes and/or deletions, new key-value pairs are written and old key-value pairs become obsolete. As a result, during subsequent flush operations, not all of the previously flushed content (e.g., keys) now residing in the objects stored on the distributed cloud object storage layer 140 is live (i.e., reachable). Accordingly, a garbage collection process (e.g., garbage collection process 300) may be used to reclaim space from all the objects stored on the distributed cloud object storage layer 140 by compacting the objects so that they only contain information that is live for the filesystem layer 110.

Garbage collection process 300 may be implemented by intermediate layer 130 to determine the currently live keys being used by the filesystem layer 110 starting from the most recent flush operation. The GC process 300 runs in two phases: (1) identification of live and dead keys in the objects, followed by (2) compaction of these cloud objects to reclaim space.

In one embodiment, the intermediate layer 130 may walk the file tree (e.g., the LSFT) to determine which keys are live and then use that information to reclaim space in objects (i.e., compaction) in the distributed cloud object storage layer 140 using garbage collection process 300. Garbage collection process 300 may begin by retrieving the last flush sequence number from Key-0, for example, special key 218 of flush metadata 210. That key stores the latest flush sequence number. In this embodiment, the latest flush sequence number in the special key 218 is FSN=99. For instance, live key map may be generated by walking the file tree (e.g., LSFT) of filesystem layer 110 starting from the latest flush sequence number (e.g., FSN=99) to determine which key-value pairs are currently relevant (i.e., reachable). This process may be iterated from the latest flush operation (e.g., FSN=99) to the oldest available FSN associated with a root metadata object in flush metadata bucket 210. The lists of FSNs that are available is chained backwards in the Root key of each FSN.

Intermediate layer 130 may use this process to generate live key map across all FSNs. Then, for each FSN, intermediate layer 130 fetches the oldest version of a root object from flush metadata bucket 210 and iterates over this root object to enumerate all objects in filesystem metadata bucket 220 and/or filesystem data bucket 230 in the flush operation. For each object in filesystem metadata bucket 220 and/or filesystem data bucket 230, intermediate layer 130 extracts live keys to consulting live key map. Once all the live key map is generated, we switch to the second phase of garbage collection: object compaction.

For example, as shown in FIG. 3, distributed cloud object storage layer 140 may include an initial object 310 identified by a flush sequence number (FSN-ID=99), an object identifier (obj-ID=1), and having a rebirth identifier (rebirth-ID=0). Initial object 310 includes a key summary section 311 that contains two keys: a first key 312 and a second key 313, and a key value section 314 that contains the corresponding value associated with each key. In this embodiment, each key identifies an offset for the corresponding value associated with the key (i.e., pointing to the content or data in the object). For example, first key 312 identifies a first offset (N) for a location of a first value 315 associated with first key 312 (i.e., first key 312 and first value 315 represent a first key-value pair) and second key 313 identifies a second offset (N+len) for a location of a second value 316 associated with second key 313 (i.e., second key 313 and second value 316 represent a second key-value pair).

As shown in FIG. 3, compacted object 320 identified by a flush sequence number (FSN-ID=99) and an object identifier (obj-ID=1) that are the same as initial object 310. However, upon completion of garbage collection process 300, compacted object 320 has a rebirth identifier (rebirth-ID=1) that is incremented/increased by one in relation to the previous rebirth identifier for initial object (rebirth-ID=0). Compacted object 320 includes key summary section 311 including both first key 312 and second key 313, as well as key value section 314 that contains the corresponding value associated with each key. In this embodiment, however, the value associated with first key 312 has been deleted or compacted. In other words, because first key 312 is no longer live, the value associated with first key 312 (i.e., first value 315) is deleted from compacted object 320. Accordingly, first key 312 identifies a null offset for the location of first value 315, since it is no longer stored in compacted object 320, while second key 313 identifies a new offset (N) for the location of second value 316 associated with second key 313. This new offset for the location of second value 316 represents the compaction of space within compacted object 320.

Figure 4:
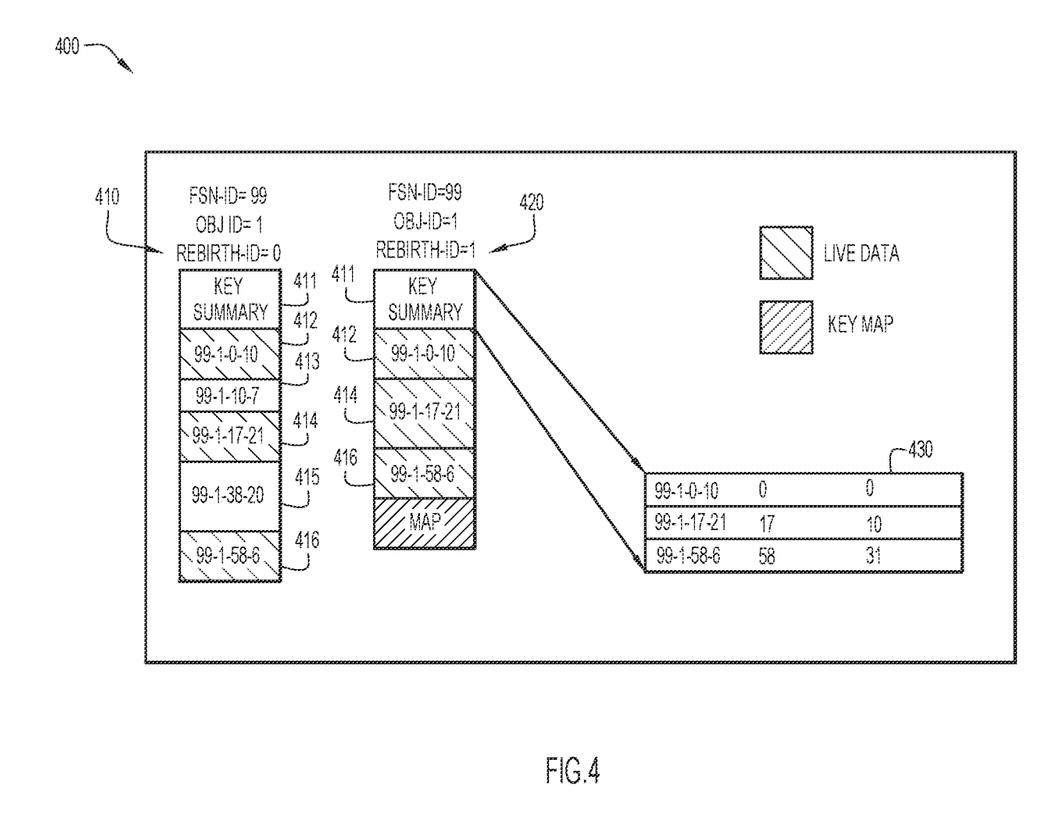
FIG. 4 is a diagram illustrating compaction of an object after a garbage collection process, according to an example embodiment.

The garbage collection compaction process implemented by intermediate layer 130 may be described in more detail in reference to FIG. 4. FIG. 4 illustrates compaction of a representative cloud object 410 during a garbage collection process 400 according to an example embodiment. In this embodiment, garbage collection process 400 is implemented by intermediate layer 130 to perform compaction on one or more objects in distributed cloud object storage layer 140, for example, representative cloud object 410. Representative object 410 is identified by a flush sequence number (FSN-ID=99), an object identifier (obj-ID=1), and having a rebirth identifier (rebirth-ID=0).

Garbage collection process 400 may begin by retrieving the last flush sequence number from Key-0, for example, special key 218 of flush metadata 210. In this embodiment, the last flush sequence number in special key 218 is FSN=99. Next, intermediate layer 130 generates a live key map from filesystem layer 110. For example, the live key map may be generated by walking the file tree (e.g., LSFT) of filesystem layer 110 starting from the most recent flush sequence number (e.g., FSN=99) to determine which key-value pairs are currently relevant (i.e., reachable). This process may be iterated from the most recent flush operation (e.g., FSN=99) to the oldest available FSN associated with a root metadata object in flush metadata bucket 210.

Intermediate layer 130 may use this process to generate the live key map across all FSNs. Then, for each FSN, intermediate layer 130 fetches the oldest version of a root object from flush metadata bucket 210 and iterates over this root object to enumerate all objects in filesystem metadata bucket 220 and/or filesystem data bucket 230 in the flush operation. For each object in filesystem metadata bucket 220 and/or filesystem data bucket 230, intermediate layer 130 extracts live keys by consulting the live key map. These live keys are added into a compacted object with the same FSN-ID and the same object-ID, but with an incremented rebirth-ID. For example, as shown in FIG. 4, compacted cloud object 420 is identified by a flush sequence number (FSN-ID=99) and an object identifier (obj-ID=1) that are the same as representative cloud object 410. However, upon completion of garbage collection process 400, compacted cloud object 420 has a rebirth identifier (rebirth-ID=1) that is incremented/increased by one in relation to the previous rebirth identifier for representative cloud object 410 (rebirth-ID=0).

For example, as shown in FIG. 4, representative cloud object 410 includes at least five keys, each having a format <FSN-ID, obj-ID, offset, length>. In this embodiment, representative cloud object 410 includes a key summary section 411 that includes a first key 412 (99-1-0-10), a second key 413 (99-1-10-17), a third key 414 (99-1-17-21), a fourth key 415 (99-1-38-20), and a fifth key 416 (99-1-58-6). Upon generating the live key map, intermediate layer 130 determines that at least two keys of representative cloud object 410 are no longer live, and, therefore, may be compacted as part of garbage collection process 400. In this embodiment, second key 413 (99-1-10-17) and fourth key 415 (99-1-38-20) are determined to no longer be live keys according to the live key map.

Next, during garbage collection process 400, the space allocated to second key 413 (99-1-10-17) and fourth key 415 (99-1-38-20) may be reclaimed or compacted in compacted cloud object 420. Upon compaction, compacted cloud object 420 includes three live keys, including first key 412 (99-1-0-10), third key 414 (99-1-17-21), and fifth key 416 (99-1-58-6). Additionally, the space reclaimed/compacted is then reallocated among the remaining live keys. This may be done by changing or remapping the offsets for the remaining live keys. For example, as shown in a key map 430 of FIG. 4, the offset associated with third key 414 is changed from 17 to 10 and the offset associated with fifth key 416 is changed from 58 to 31. That is, the space in compacted cloud object 420 previously associated with second key 413 and fourth key 415 may be now be consolidated and used by the remaining live keys (e.g., first key 412, third key 414, and fifth key 416).

Upon competition of garbage collection process 400 for all objects in this flush, the corresponding root object in flush metadata bucket 210 may be updated with the new object layout information and key summary for compacted cloud object 420. This operation creates a consistent view with the new root object and thus acts as a commit phase of the garbage collection process. Additionally, intermediate layer 130 may delete older versions of root objects in flush metadata bucket 210 and any corresponding objects in filesystem metadata bucket 220 and/or filesystem data bucket 230 associated with older rebirth identifiers (i.e., rebirth-IDs less than the current rebirth-ID).

Figure 5:
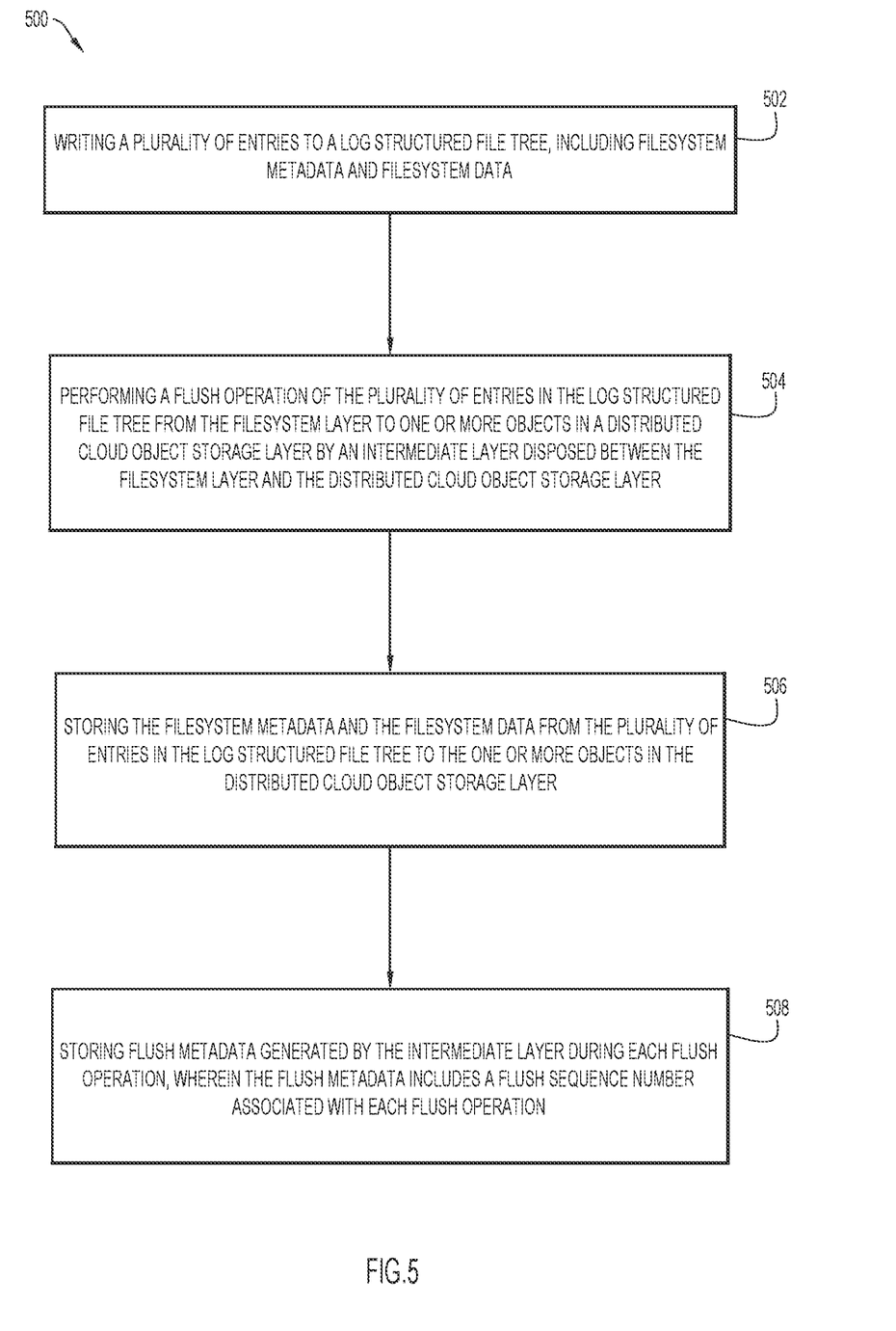
FIG. 5 is a flowchart of a method for filesystem management for cloud object storage, according to an example embodiment.

FIG. 5 illustrates a flowchart for a method 500 for filesystem management for cloud object storage according to an example embodiment. In an example embodiment, method 500 may be implemented by an intermediate layer (e.g., intermediate layer 130) disposed between a filesystem layer (e.g., filesystem layer 110) and a cloud object store (e.g., distributed cloud object storage layer 140). In this embodiment, method 500 may begin with an operation 502, where a filesystem layer writes a plurality of entries to a LSFT. For example, one or more clients/applications, such as enterprise applications 112, 114, 116, may execute data I/O writes to filesystem layer 110 via POSIX-compliant interface 120. These data I/O writes may be written in LSFT, for example, in an intent log or read/write cache of filesystem layer 110. In an example embodiment, the plurality of entries includes filesystem metadata and/or filesystem data.

Next, an operation 504, a flush operation is performed of the plurality of entries in the LSFT from the filesystem layer to one or more objects in a distributed cloud object storage layer by an intermediate layer disposed between the filesystem layer and the distributed cloud object storage layer. For example, as shown in FIG. 1, a flush operation may be performed on filesystem layer 110 by intermediate layer 130 of a plurality of entries of a LSFT (e.g., from an intent log or read/write cache) associated with first super block 132 to a plurality of objects stored at distributed cloud object storage layer 140.

At an operation 506, filesystem metadata and/or filesystem data from the plurality of entries in the LSFT are stored to the one or more cloud objects in the distributed cloud object storage layer. For example, as shown in FIG. 1, plurality of filesystem metadata objects 134 and plurality of filesystem data objects 136 are stored to distributed cloud object storage layer 140 in a plurality of cloud objects, including one or more of plurality of cloud objects 141-146.

In addition, method 500 includes storing flush metadata generated by the intermediate layer during each flush operation. This flush metadata includes information associated with each flush operation, including a flush sequence number (FSN). For example, as shown in FIG. 2, flush metadata bucket 210 includes objects 212, 214, 216 associated with, respectively, flush operations having FSN=97, FSN=98, and FSN=99. Additionally, upon completion of each flush operation, intermediate layer 130 may also update a special key (e.g., special key 218) in the flush metadata bucket with the FSN for the completed flush operation. Method 500 may repeat for each additional flush operation.

Figure 6:
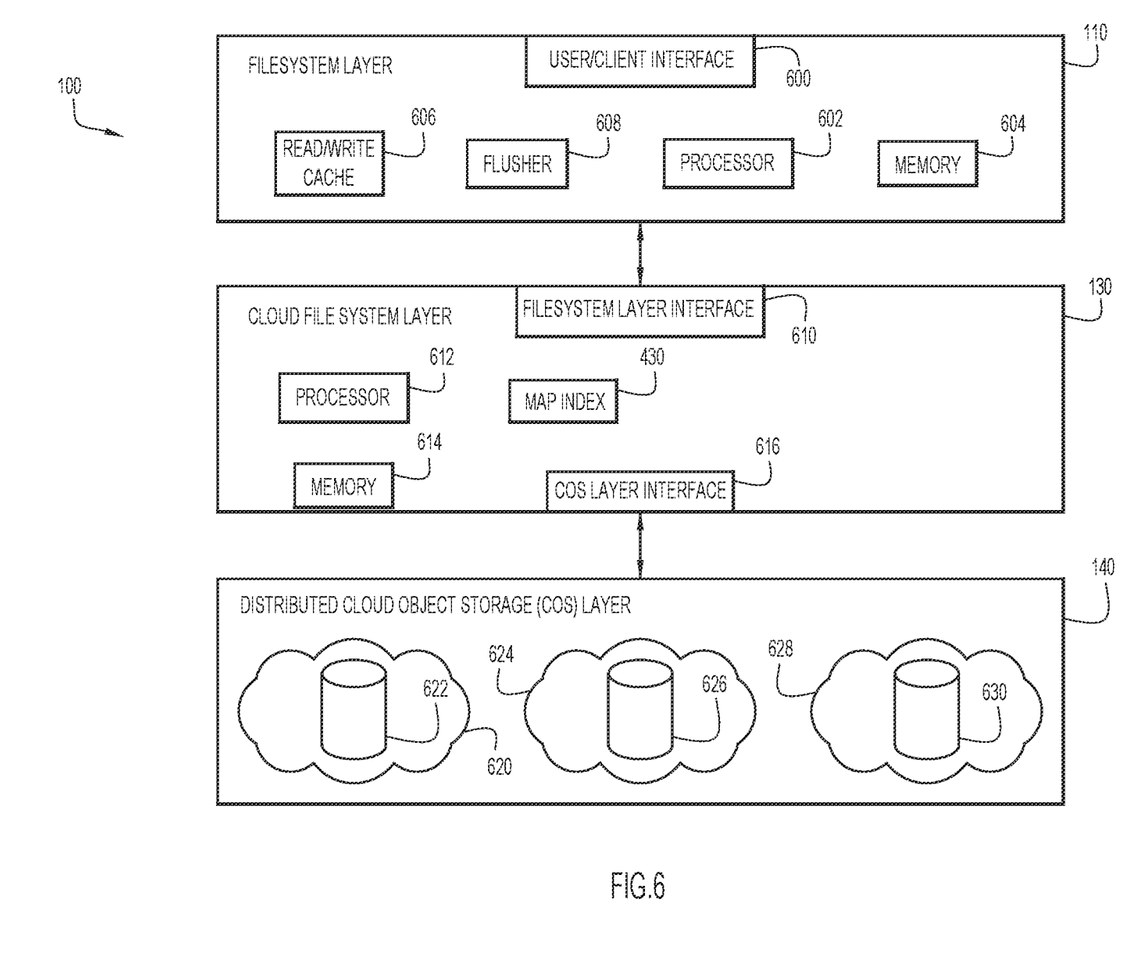
FIG. 6 is a logical diagram of a system in which filesystem management for cloud object storage may implemented, according to an example embodiment.

FIG. 6 is a logical diagram of system 100 in which filesystem management for cloud object storage may implemented, according to an example embodiment. As described above, system 100 includes filesystem layer 110, intermediate layer 130 (e.g., cloud filesystem), and distributed cloud object storage layer 140. In an example embodiment, filesystem layer 110 may include a user/client interface 600 that is configured to allow filesystem layer 110 to communicate with one or more users and/or clients, for example, users or clients of one or more of enterprise applications 112, 114, 116. In one embodiment, user/client interface 600 may be POSIX-compliant, for example, POSIX-compliant interface 120. Filesystem layer 110 may include a processor 602 for processing information and may further include a bus (not shown) or other communication mechanism coupled with processor 602 for communicating the information. While the figure shows a single block 602 for a processor, it should be understood that the processor 602 may represent a plurality of processing cores, each of which can perform separate processing.

Filesystem layer 110 may also include a memory 604. The memory 604 may be read only memory (ROM), random access memory (RAM), magnetic disk storage media devices, optical storage media devices, flash memory devices, electrical, optical, or other physical/tangible memory storage devices. Thus, in general, the memory 604 may comprise one or more tangible (non-transitory) computer readable storage media (e.g., a memory device) encoded with software comprising computer executable instructions and when the software is executed (by the processor 602) it is operable to perform the operations described herein. For example, one or more of a read/write cache or intent log 606 and/or flusher logic 608 may be stored in memory 604 for providing one or more of the functions of filesystem layer 110 described herein. In particular, read/write cache or intent log 606 may be used by filesystem layer 110 to capture incoming data I/O writes in a LSFT, as described above. Flusher logic 608 may cause filesystem layer 110 to initiate a flush operation, as described above in connection with FIGS. 1-5 above when executed by processor 602 from memory 604.

In an example embodiment, intermediate layer 130 may include a filesystem interface 610 that is configured to allow intermediate layer 130 to communicate with filesystem layer 110. In some embodiments, intermediate layer 130 may be executed in software, hardware, or a combination of both. For example, in one embodiment, intermediate layer 130 may be a virtual machine executing on a server or computer that is hosting filesystem layer 110. Intermediate layer 130 may include a processor 612 for processing information and may further include a bus (not shown) or other communication mechanism coupled with processor 612 for communicating the information. While the figure shows a single block 612 for a processor, it should be understood that the processor 612 may represent a plurality of processing cores, each of which can perform separate processing.

Intermediate layer 130 may also include a memory 614. The memory 614 may be read only memory (ROM), random access memory (RAM), magnetic disk storage media devices, optical storage media devices, flash memory devices, electrical, optical, or other physical/tangible memory storage devices. Thus, in general, the memory 614 may comprise one or more tangible (non-transitory) computer readable storage media (e.g., a memory device) encoded with software comprising computer executable instructions and when the software is executed (by the processor 612) it is operable to perform the operations described herein. For example, one or more of a flush operation logic and map index 430 may be stored in memory 614 for providing one or more of the functions of intermediate layer 130 described herein. In particular, flush operation logic and map index 430 may cause intermediate layer 130 to perform the operations described above in connection with FIGS. 1-6 when executed by processor 612 from memory 614.

Intermediate layer 130 may also include a COS layer interface 616. COS layer interface 616 is configured to allow intermediate layer 130 to communicate with distributed cloud object storage layer 140. Distributed cloud object storage layer 140 may include a plurality of cloud object stores (COS). For example, distributed cloud object storage layer 140 may include a first COS 620, a second COS 624, and/or a third COS 1228. Each COS 620, 624, 1228 may be associated with a different cloud storage service provider or may be associated with different data centers or other locations associated with one or more cloud storage service providers. In addition, each COS 620, 624, 1228 includes one or more storage devices that are configured to store the cloud objects described above. For example, COS 620 may include a first storage device 622, second COS 624 may include a second storage device 626, and third COS may include a third storage device 630. Moreover, each storage device 622, 626, 630 may be a plurality of distributed storage devices.

According to the principles of the embodiments described herein, durable writes may be provided, where a distributed cloud object storage layer guarantees that completed transactions persist in the event of crashes or server failure. Additionally, the example embodiments provide transparent remapping of data on the distributed cloud object storage layer, where data written by legacy applications on a filesystem layer can be moved around for space-management, reliability or availability reasons The example embodiments provide a mechanism to have durable and transparent writes/reads with performance to client I/O while managing filesystem operations, such as translating the writes onto COS, running management operations like garbage collection, deduplication, and performance optimization for sequential reads.

In summary, a method is provided comprising: writing, by a filesystem layer, a plurality of entries to a log structured file tree, wherein the plurality of entries include filesystem metadata and filesystem data; performing a flush operation of the plurality of entries in the log structured file tree from the filesystem layer to one or more objects in a distributed cloud object storage layer comprising a plurality of distributed storage devices by an intermediate layer disposed between the filesystem layer and the distributed cloud object storage layer; storing the filesystem metadata and the filesystem data from the plurality of entries in the log structured file tree to the one or more objects in the distributed cloud object storage layer; storing flush metadata generated by the intermediate layer during each flush operation, wherein the flush metadata includes a flush sequence number associated with each flush operation; and wherein each object of the one or more objects in the distributed cloud object storage layer is identified by a key that identifies the flush sequence number, an object identifier, and a rebirth identifier.

In another form, a non-transitory computer readable storage media encoded with instructions that, when executed by a processor of an intermediate layer disposed between a filesystem layer and a distributed cloud object storage layer, cause the processor to: perform a flush operation of a plurality of entries in a log structured file tree of the filesystem layer from the filesystem layer to one or more objects in the distributed cloud object storage layer comprising a plurality of distributed storage devices, wherein the plurality of entries include filesystem metadata and filesystem data; store the filesystem metadata and the filesystem data from the plurality of entries in the log structured file tree to the one or more objects in the distributed cloud object storage layer; store flush metadata generated by the intermediate layer during each flush operation, wherein the flush metadata includes a flush sequence number associated with each flush operation; and wherein each object of the one or more objects in the distributed cloud object storage layer is identified by a key that identifies the flush sequence number, an object identifier, and a rebirth identifier.

In another embodiment, a system is provided comprising: an intermediate layer disposed between a filesystem layer and a distributed cloud object storage layer; wherein the intermediate layer includes at least a memory and a processor in communication with the memory; and wherein the processor is configured to: perform a flush operation of a plurality of entries in a log structured file tree of the filesystem layer from the filesystem layer to one or more objects in the distributed cloud object storage layer comprising a plurality of distributed storage devices, wherein the plurality of entries includes filesystem metadata and filesystem data; store the filesystem metadata and the filesystem data from the plurality of entries in the log structured file tree to the one or more objects in the distributed cloud object storage layer; store flush metadata generated by the intermediate layer during each flush operation, wherein the flush metadata includes a flush sequence number associated with each flush operation; and wherein each object of the one or more objects in the distributed cloud object storage layer is identified by a key that identifies the flush sequence number, an object identifier, and a rebirth identifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   writing, by a filesystem layer, a plurality of entries to a log structured file tree, wherein the plurality of entries includes filesystem metadata and filesystem data;
   performing a flush operation of the plurality of entries in the log structured file tree from the filesystem layer to one or more objects in a distributed cloud object storage layer comprising a plurality of distributed storage devices by an intermediate layer disposed between the filesystem layer and the distributed cloud object storage layer;
   storing the filesystem metadata and the filesystem data from non-versioned buckets in the plurality of entries in the log structured file tree to the one or more objects in the distributed cloud object storage layer;
   storing flush metadata generated by the intermediate layer during each flush operation_from versioned buckets in the plurality of entries in the log structured file tree, wherein the flush metadata includes a flush sequence number associated with each flush operation; and
   performing a garbage collection process to reclaim space in the one or more objects in the distributed cloud object storage layer from obsolete entries in the log structured file tree,
   wherein each object of the one or more objects in the distributed cloud object storage layer is identified by a key that identifies the flush sequence number that is incremented with each flush operation, an object identifier, and a rebirth identifier that is incremented during the garbage collection process separately from the flush sequence number, and
   wherein storing the filesystem metadata and the filesystem data from the non-versioned buckets comprises storing the filesystem metadata and the filesystem data to a particular object of the one or more objects in the distributed cloud object storage layer, which replaces the key identifying the particular object.

2. The method of claim 1, wherein the flush metadata includes a special key that identifies a flush sequence number for a last valid flush operation.

3. The method of claim 2, further comprising:
   upon startup after a crash, reading the special key in the flush metadata to determine a last flush sequence number for the last valid flush operation; and
   deleting any objects in the distributed cloud object storage layer that are identified by a flush sequence number that is greater than the last flush sequence number.

4. The method of claim 2, further comprising:
   upon completion of a flush operation, saving a next flush sequence number to the special key in the flush metadata, wherein the next flush sequence number is one greater than the flush sequence number previously identified by the special key.

5. The method of claim 1, wherein the flush sequence number is a monotonically increasing flush sequence number for each successful flush operation.

6. The method of claim 1, further comprising:
   performing compaction of one or more files associated with at least one object in the distributed cloud object storage layer as part of the garbage collection process.

7. The method of claim 6, further comprising:
   incrementing the rebirth identifier for an object by one after performing the garbage collection process on the object.

8. One or more non-transitory computer readable storage media encoded with instructions that, when executed by a processor of an intermediate layer disposed between a filesystem layer and a distributed cloud object storage layer, cause the processor to:
   perform a flush operation of a plurality of entries in a log structured file tree of the filesystem layer from the filesystem layer to one or more objects in the distributed cloud object storage layer comprising a plurality of distributed storage devices, wherein the plurality of entries includes filesystem metadata and filesystem data;
   store the filesystem metadata and the filesystem data from non-versioned buckets in the plurality of entries in the log structured file tree to the one or more objects in the distributed cloud object storage layer;
   store flush metadata generated by the intermediate layer during each flush operation from versioned buckets in the plurality of entries in the log structured file tree, wherein the flush metadata includes a flush sequence number associated with each flush operation; and
   perform a garbage collection process to reclaim space in the one or more objects in the distributed cloud object storage layer from obsolete entries in the log structured file tree,
   wherein each object of the one or more objects in the distributed cloud object storage layer is identified by a key that identifies the flush sequence number that is incremented with each flush operation, an object identifier, and a rebirth identifier that is incremented during the garbage collection process separately from the flush sequence number, and wherein storing the filesystem metadata and the filesystem data from the non-versioned buckets comprises storing the filesystem metadata and the filesystem data to a particular object of the one or more objects in the distributed cloud object storage layer, which causes the processor to replace the key identifying the particular object.

9. The one or more non-transitory computer readable storage media of claim 8, wherein the flush metadata includes a special key that identifies a flush sequence number for a last valid flush operation.

10. The one or more non-transitory computer readable storage media of claim 9, further comprising instructions to cause the processor to:
upon startup after a crash, read the special key in the flush metadata to determine a last flush sequence number for the last valid flush operation; and
delete any objects in the distributed cloud object storage layer that are identified by a flush sequence number that is greater than the last flush sequence number.

11. The one or more non-transitory computer readable storage media of claim 9, further comprising instructions to cause the processor to:
upon completion of a flush operation, save a next flush sequence number to the special key in the flush metadata, wherein the next flush sequence number is one greater than the flush sequence number previously identified by the special key.

12. The one or more non-transitory computer readable storage media of claim 8, wherein the flush sequence number is a monotonically increasing flush sequence number for each successful flush operation.

13. The one or more non-transitory computer readable storage media of claim 8, further comprising instructions to cause the processor to:
perform compaction of one or more files associated with at least one object in the distributed cloud object storage layer as part of the garbage collection process.

14. The one or more non-transitory computer readable storage media of claim 13, further comprising instructions to cause the processor to:
increment the rebirth identifier for an object by one after performing the garbage collection process on the object.

15. A system comprising:
an intermediate layer disposed between a filesystem layer and a distributed cloud object storage layer, wherein the intermediate layer includes at least a memory and a processor in communication with the memory; and
wherein the processor is configured to:
perform a flush operation of a plurality of entries in a log structured file tree of the filesystem layer from the filesystem layer to one or more objects in the distributed cloud object storage layer comprising a plurality of distributed storage devices, wherein the plurality of entries includes filesystem metadata and filesystem data;
store the filesystem metadata and the filesystem data from non-versioned buckets in the plurality of entries in the log structured file tree to the one or more objects in the distributed cloud object storage layer;
store flush metadata generated by the intermediate layer during each flush operation from versioned buckets in the plurality of entries in the log structured file tree, wherein the flush metadata includes a flush sequence number associated with each flush operation; and
perform a garbage collection process to reclaim space in the one or more objects in the distributed cloud object storage layer from obsolete entries in the log structured file tree,
wherein each object of the one or more objects in the distributed cloud object storage layer is identified by a key that identifies the flush sequence number that is incremented with each flush operation, an object identifier, and a rebirth identifier that is incremented during the garbage collection process separately from the flush sequence number, and
wherein storing the filesystem metadata and the filesystem data from the non-versioned buckets comprises storing the filesystem metadata and the filesystem data to a particular object of the one or more objects in the distributed cloud object storage layer, which causes the processor to replace the key identifying the particular object.

16. The system of claim 15, wherein the flush metadata includes a special key that identifies a flush sequence number for a last valid flush operation.

17. The system of claim 16, wherein the processor is further configured to:
upon startup after a crash, read the special key in the flush metadata to determine a last flush sequence number for the last valid flush operation; and
delete any objects in the distributed cloud object storage layer that are identified by a flush sequence number that is greater than the last flush sequence number.

18. The system of claim 16, wherein the processor is further configured to:
upon completion of a flush operation, save a next flush sequence number to the special key in the flush metadata, wherein the next flush sequence number is one greater than the flush sequence number previously identified by the special key.

19. The system of claim 15, wherein the processor is further configured to:
perform compaction of one or more files associated with at least one object in the distributed cloud object storage layer as part of the garbage collection process.

20. The system of claim 19, wherein the processor is further configured to:
increment the rebirth identifier for an object by one after performing the garbage collection process on the object.

* * * * *